Sept. 26, 1939.   G. C. PARRISH   2,174,135
VEHICLE EMERGENCY BRAKE
Filed May 17, 1939   2 Sheets-Sheet 1
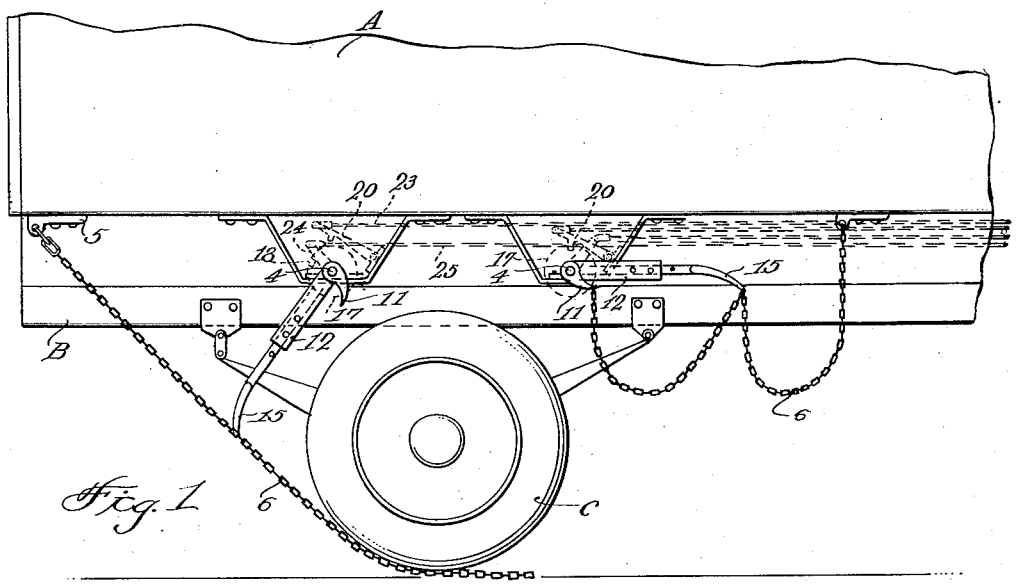
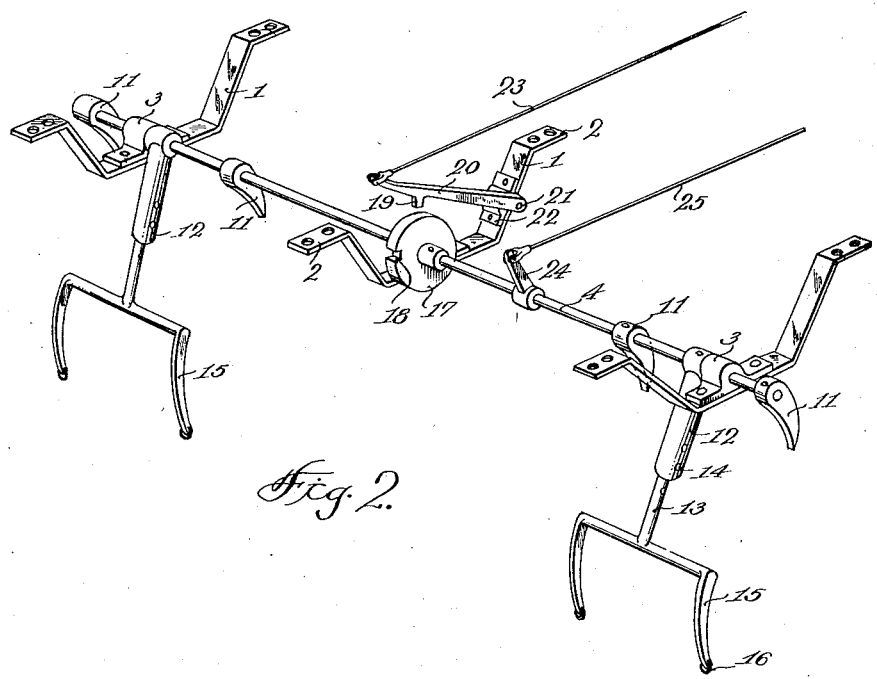
Grover C. Parrish   INVENTOR
BY Victor J. Evans & Co.
ATTORNE Sept. 26, 1939.　　　G. C. PARRISH　　　2,174,135
VEHICLE EMERGENCY BRAKE
Filed May 17, 1939　　　2 Sheets-Sheet 2
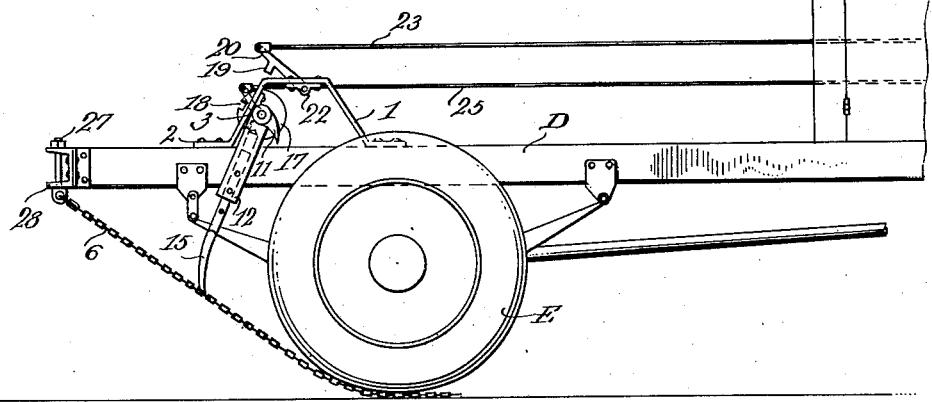
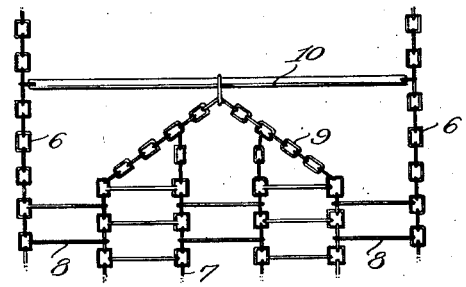
Grover C. Parrish
INVENTOR
BY Victor J. Evans & Co.
ATTORNEYS Patented Sept. 26, 1939

2,174,135

UNITED STATES PATENT OFFICE 2,174,135

VEHICLE EMERGENCY BRAKE

Grover C. Parrish, Brazil, Ind., assignor of one-half to Mayme Bender Gardner, Brazil, Ind.

Application May 17, 1939, Serial No. 274,258

5 Claims. (Cl. 188—4)

This invention relates to emergency brakes for motor vehicles, particularly the type used on motor freight lines, such as trailer trucks and the like, and its general object is to provide a safety emergency brake that includes mats in the form of chains or the like, attached to the vehicle and adapted to be lowered upon the ground in the path of the vehicle wheels to receive the latter for the disposal of the mats between the wheels and the ground, thus acting to bring the vehicle to an abrupt stop without lateral skidding thereof.

A further object is to provide a safety emergency brake that can be instantly applied to operative position and requires no hydraulic, compressed air or electric means for that purpose.

A further object is to provide a safety emergency brake that is inexpensive to manufacture, install and maintain, as well as simple in construction, and extremely efficient in operation, use and service.

This invention also consists in certain other features of construction and in the combination and arrangement of the several parts, to be hereinafter fully described, illustrated in the accompanying drawings and especially pointed out in the appended claims.

In describing the invention in detail, reference will be had to the accompanying drawings wherein like characters denote like or corresponding parts throughout the several views, and in which:

Figure 1 is a side elevation illustrating the brakes which form the subject matter of the present invention installed on a semi-trailer used with a highway tractor.

Figure 2 is a perspective view of the brake operating mechanism.

Figure 3 is a side elevation illustrating the brake installed on the tractor.

Figure 4 is a view illustrating a fragmentary portion of one of the mats.

While the brakes can be installed in pairs, as shown in Figure 1, and on both the trailer and the tractor, it will be understood that only one set of brakes may be installed for use on either the trailer or tractor, and it will be further understood that they can be installed on any type of motor vehicle.

Referring to the drawings in detail and particularly to Figure 1, the letter A indicates the body of the semi-trailer, B the chassis and C the wheels, and each set of brakes which forms the subject matter of the present invention preferably includes three hanger brackets 1 of substantially U-shaped formation to provide converging arms having attaching ears 2 extending outwardly from the upper ends thereof for receiving suitable securing means for fixing the hanger brackets to the undersurface of the body A in depending relation with respect thereto, as shown.

The hanger brackets are of course disposed in parallelism with respect to each other, and fixed to the bight portions thereof are bearing members 3 within which is mounted a rock shaft 4 for disposal transversely of the trailer, as will be obvious upon inspection of Figure 2.

The body has also secured thereto block brackets 5 for connecting one of the ends of the mats thereto, and it will of course be understood that each set of brakes includes two mats, one for each wheel. The mats as shown are in the form of chains and each mat includes side chains 6 and intermediate chains 7 arranged in pairs, and the chains 6 and 7 are connected together by cross links 8, as shown in Figure 4. Connected to one of the ends of the intermediate chains 7, are converging chains 9 that are in turn connected to a cross bar 10 having its ends connected to the side chains.

Fixed to the shaft 4 are hook members 11 arranged in pairs, with the hook member of each pair disposed upon opposite sides of the end hanger brackets 1, as shown in Figure 2, and the hook members are curved from their point of connection with the shaft and terminate in pointed free ends for the purpose of receiving the free end links of the side chains of the mats, for cooperation with means which will be presently described for holding the mats in normal or elevated position, as shown on the right hand side of Figure 1.

The cooperating means above referred to includes sectional arms, and one of the sections which is indicated by the reference numeral 12 is in the form of a tube, the tubular sections being fixed to the shaft 4 for engagement with the inner faces of the end bearing blocks 5 to prevent endwise movement of the shaft, as will be apparent, while the other sections are in the form of shanks 13 telescopically mounted in the tubular sections for adjustment, to vary the lengths of the arms. The shank sections are held in adjusted positions, by screw bolts 14 or the like and formed on the outer end of the shanks are U-shaped members to provide forks 15 having openings in the outer ends thereof within which are mounted rings 16 that likewise extend through certain links of the side chains, substantially midway the ends of the mats as shown in Figure 1. The fingers of the forks are preferably of arcuate formation and have the mats permanently connected thereto through the medium of the rings 16, as set forth.

Fixed to the shaft 4 for disposal in close proximity to the intermediate hanger bracket 1, is the hub of a latching disk 17 provided with a square cornered notch 18 in its periphery for the purpose of receiving a lug 19 formed on a latch lever 20 for holding the brake in normal or inoperative position, as shown on the right hand side of Figure 1. The latch lever is preferably tapered toward one end, and has a stub shaft 21 secured to its opposite end and pivotally mounted within a bearing block 22 secured to the intermediate hanger bracket 1 and preferably to the rear arm thereof, as best shown in Figure 2, when the brake is installed on a semi-trailer, as shown in Figure 1.

Connected to the outer end of the latch lever 20 is one end of a rod or the like 23 for moving the lug 19 out of the notch of the latching disk 17, when it is desired to apply the brakes, or in other words to lower the mats from their normal or inoperative position as shown on the right hand side of Figure 1, to their operative position as shown on the left hand side of that figure. It will be obvious that the forked arms drop by gravity when the latching disk 17 is released, and in order to raise the forked arms to their normal position, the shaft has secured thereto an arm 24 which has one end of a rod or the like 25 connected to the outer end thereof. The connecting rods 23 and 25 have their opposite ends connected to suitable means such as a lever or the like mounted in convenient reach of the operator of the vehicle, as will be apparent.

In Figure 3, the brakes are shown as being installed upon a tractor and for the purpose of distinction, the letter D indicates the chassis thereof, and E the rear or driving wheels. The structure of the brakes as shown in Figure 3 are similar in all respects to that previously described and shown in Figures 1 and 2, with the exception that the mats are shown as being connected to eye bolts 27 mounted in brackets 28 secured to the rear end of the chassis. The arrangement of certain parts of the structure of Figure 3 is likewise different, in that the U-shaped brackets 1 are secured to the chassis D and rise therefrom, and the bearing members 3 are secured to the rear arms of the brackets 1, for mounting the rock shaft 4 accordingly, while the latch lever 20 has its bearing block fixed to the bight portion of the intermediate bracket, as shown. When the brakes are installed on a different type of vehicle than that shown, it will be obvious that the parts can be arranged to suit the vehicle structure.

It is believed from the foregoing description and disclosure of the drawings, that the operation of my brakes will be obvious, but it might be mentioned that the mats are normally disposed as shown on the right hand side of Figure 1. In the event it becomes necessary or desirable to bring the vehicle to a quick stop, the operator will raise the latch lever 20 through the medium of the rod 23 for releasing the disk 17 and when such is released, the rock shaft will turn in its bearings due to the weight of the forked arms. The turning movement of the rock shaft will result in the hook members 11 being moved to a position for releasing the free ends of the mats which will drop by gravity in the path of the vehicle wheels and be held accordingly by the forked arms, for the wheels to run upon the mats for disposal of the latter between the wheels and the ground, with the result it will be seen that the mats act to stop the vehicle. It will likewise be obvious from Figure 3 and from the left hand side of Figure 1, that the brakes will hold the vehicle to prevent the same from backing down an inclined surface or hill, therefore it will be seen that it is desirable to install two sets of brakes on heavy freight carrying trucks, and preferably three on a semi-trailer and tractor, as shown in Figures 1 and 3.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. An emergency brake for a motor vehicle, comprising ground engaging mats, means fixedly connecting one of the ends of the mats to the vehicle, a rock shaft mounted on the vehicle, means secured to the rock shaft for receiving the opposite ends of the mats for detachable connection thereto, means secured to the rock shaft and having the mats fixedly connected thereto intermediate their ends for supporting the mats accordingly, latch means for normally holding the rock shaft against turning with the mats out of ground engaging position, and means for releasing the latch means for dropping the mats in the path of the vehicle wheels for the latter to run thereon.

2. An emergency brake for a motor vehicle, comprising ground engaging mats, means fixedly connecting one of the ends of the mats to the vehicle, a rock shaft mounted on the vehicle, hook means secured to the rock shaft for receiving the opposite ends of the mats for detachable connection thereto, forked means secured to the rock shaft and having the mats fixedly connected intermediate their ends to the forks thereof for supporting the mats accordingly, latch means for normally holding the rock shaft against turning with the mats out of ground engaging position, and means operable from the driver's seat of the vehicle for releasing the latch means for dropping the mats in the path of the vehicle wheels for the latter to run thereon.

3. An emergency brake for a motor vehicle, comprising ground engaging mats, means fixedly connecting one of the ends of the mats to the vehicle, a rock shaft mounted on the vehicle, hook means secured to the rock shaft for receiving the opposite ends of the mats for detachable connection thereto, arms including telescopically mounted sections to vary the length thereof and secured to the shaft, means for holding the sections in adjusted positions, forks included in the arms and having the mats fixedly connected intermediate their ends thereto for supporting the mats accordingly, latch means for normally holding the rock shaft against turning in one direction with the mats out of ground engaging position, means for releasing the latch means for dropping the mats in the path of the vehicle wheels for the latter to run thereon, means for manually turning said shaft in an opposite direction, and the latter means together with the releasable means being operable from the driver's seat of the vehicle.

4. An emergency brake for a motor vehicle, comprising ground engaging mats in the form of chains, means fixedly connecting one of the ends of the mats to the vehicle, a rock shaft mounted on the vehicle and extending transversely thereof, hook means secured to the rock shaft for receiving the opposite ends of the mats for detachable connection thereto, forked means secured to the rock shaft and having the mats fixedly connected intermediate their ends to the forks thereof for supporting the mats accordingly, latching means including a disk secured to the shaft and having a notch in the periphery thereof, a latch lever pivotally mounted and including means receivable in the notch for holding the rock shaft against turning with the mats out of ground engaging position, and means operable from the driver's seat of the vehicle for releasing the latch means for dropping the mats in the path of the vehicle wheels for the latter to run thereon.

5. An emergency brake for a motor vehicle, comprising ground engaging mats, means fixedly connecting one of the ends of the mats to the vehicle, substantially U-shaped brackets secured to the vehicle and arranged in parallelism with each other, bearing blocks secured to the U-shaped brackets, a rock shaft mounted in the bearing blocks for disposal transversely of the vehicle, hook means secured to the rock shaft for receiving the opposite ends of the mats for detachable connection thereto, adjustable means includig forks and secured to the rock shaft and having the mats fixedly connected intermediate their ends to the forks thereof for supporting the mats accordingly, said adjustable means engageable with certain of the bearing blocks to prevent endwise movement of said shaft, a latching disk secured to said shaft intermediate its ends and having a notch in the periphery thereof, a latch lever pivotally connected to one of said brackets, a lug formed on said lever and receivable in the notch for holding the rock shaft against turning with the mats out of ground engaging position, means operable from the driver's seat of the vehicle for moving the lug out of the notch to bring about turning of the shaft in one direction for dropping the mats in the path of the vehicle wheels for the latter to run thereon, and means operable from the driver's seat for turning the shaft in an opposite direction.

GROVER C. PARRISH.